Figure 1:
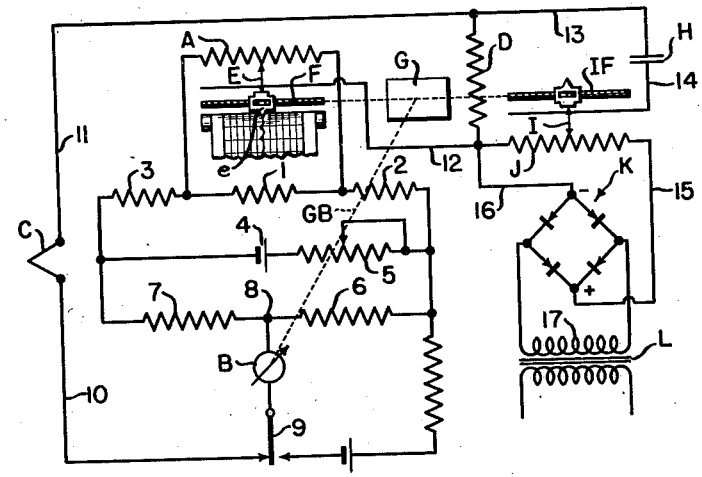

May 22, 1945.  H. S. JONES  2,376,599

MEASURING AND CONTROLLING APPARATUS

Filed Jan. 23, 1943

INVENTOR.
HARRY S. JONES

BY
*C. B. Spangenberg*
ATTORNEY.

Patented May 22, 1945

2,376,599

UNITED STATES PATENT OFFICE 2,376,599

MEASURING AND CONTROLLING APPARATUS

Harry S. Jones, Washington, D. C., assignor to The Brown Instrument Company, Philadelphia, Pa., a corporation of Pennsylvania Application January 23, 1943, Serial No. 473,344

5 Claims. (Cl. 172—239)

The general object of the present invention is to improve self-balancing measuring and control apparatus of the type comprising a normally balanced electrical network, means for unbalancing said network on a change in a quantity or condition to be measured, and means for automatically rebalancing said network, when unbalanced, and thereby providing a measure of the change which unbalanced the network, and for indicating, recording, and/or producing a control effect in accordance with the magnitude of the change. The present invention was primarily devised, and is especially adapted, for use in self-balancing potentiometers of kinds now in extensive use for measuring thermocouple and other small voltage changes, and which are well adapted to furnish an accurate measure of the magnitude, or changes in magnitude, of any measurable condition, mechanical, chemical, physical, etc., giving rise to a small voltage indication of the value of the measurable condition.

In the operation of such apparatus, trouble has been experienced from the tendency of the rebalancing mechanism to unduly extend or prolong each of its rebalancing operations and the resultant tendency to unbalance the network in the opposite direction. Such over balancing, or over shooting, ordinarily results from the slow action of, and/or inertia of the rebalancing mechanism, and has been a common cause of objectionable hunting in the operation of such measuring and control apparatus.

Heretofore various arrangements have been devised for temporarily impressing a voltage opposite in polarity to the voltage being measured on the detection circuit branch of the measuring network in the course of each rebalancing operation, to thereby restore the galvanometer or other detector means responsive to current flow in the detection circuit branch, to its normal condition and to thereby terminate the rebalancing operation, prior to the restoration of the normal, balanced network condition. For convenience, the voltage thus temporarily impressed on the detection circuit in the course of a rebalancing operation, is hereinafter designated an "anti-hunting" voltage.

A specific object of the present invention is to provide improved means, characterized by its simplicity and effectiveness, for impressing an anti-hunting voltage on the detection circuit of a self-balancing potentiometer. A more specific object of the present invention is to couple the detection circuit with a local circuit including a condenser and an adjustable voltage source by means of a resistance common to both circuits, and to provide means through which said voltage source is mechanically adjusted by the rebalancing mechanism, on and in accordance with the rebalancing operation of the latter, to create a temporary condenser charging or discharging current flow through said resistance and thereby create a potential drop in said resistance which will constitute a suitable anti-hunting voltage.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 2:
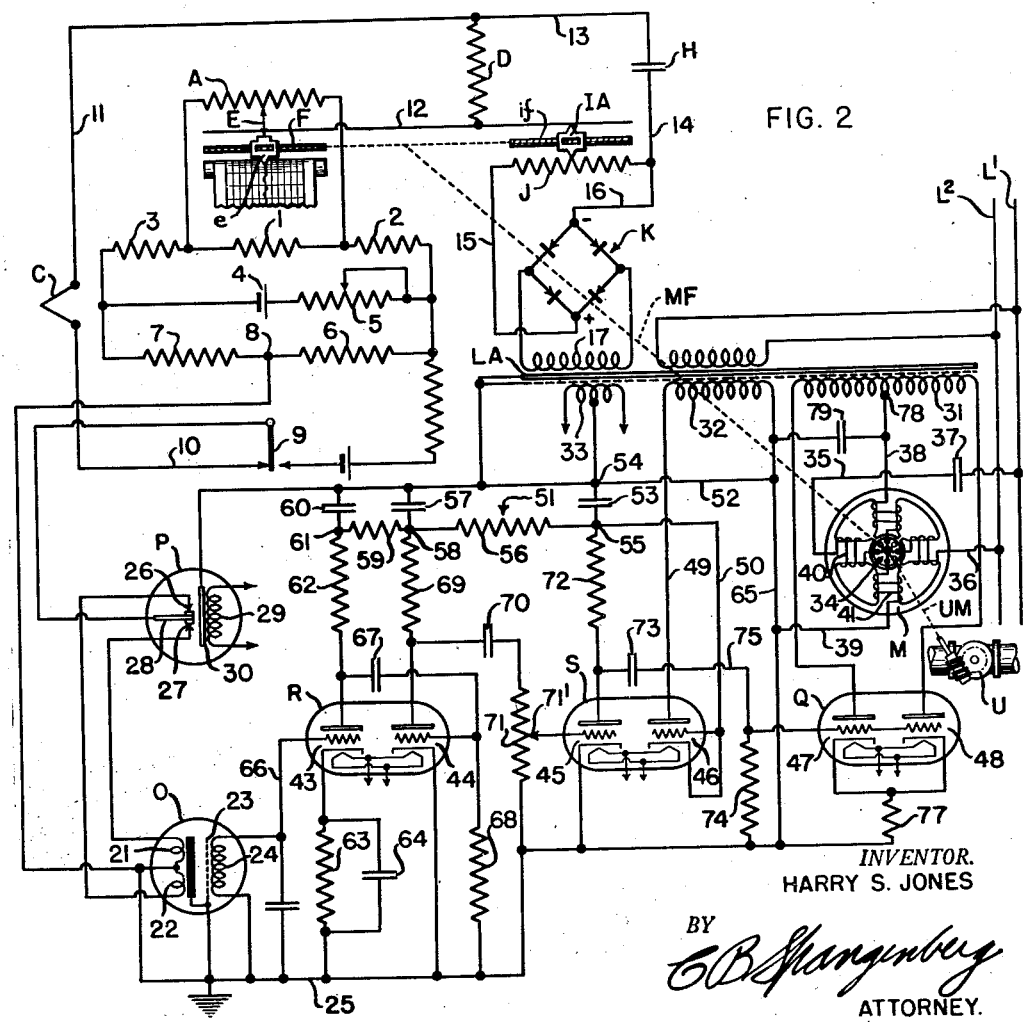

Of the drawing:

Fig. 1 is a diagrammatic representation of a simple embodiment of the invention; and Fig. 2 is a diagrammatic representation of a measuring and control apparatus more sensitive and less simple than that shown in Fig. 1.

In Fig. 1 I have illustrated the use of the present invention in connection with a self-balancing, recording potentiometer of the well known and widely used type comprising a measuring network including a split potentiometer bridge circuit of conventional form. Said bridge circuit comprises a slide wire potentiometer resistor A connected in shunt to a resistance 1 which is connected in series with resistances 2 and 3 to form one of the three main branches of the bridge circuit. The energizing branch of the bridge circuit includes a battery source of energizing current 4 and the usual adjustable resistance 5 for regulating the strength of the bridge energizing current. The third main branch of the bridge circuit includes resistances 6 and 7 connected in series.

The detection circuit portion of the network shown in Fig. 1 includes a galvanometer B having one terminal connected to the third branch of the bridge circuit at a point 8 between the resistances 6 and 7, and having its other terminal connected to the usual calibration switch 9, a conductor 10 normally connected to the galvanometer by the switch 9, a thermocouple C, a conductor 11, an anti-hunting resistance D, a conductor 12, and a contact E engaging the resistor A and adjustable relative to the latter along the length of the resistor. The detector circuit is completed between the contact E and point 8 by the potentiometer bridge circuit.

As diagrammatically shown, the contact E is mounted on the potentiometer instrument pen carriage e, which is in threaded engagement with a threaded shaft F alongside the resistor A and operating, when rotated, to adjust the contact E along the resistor A. In the normal balanced condition of the measuring network shown in Fig. 1, the position of the contact E along the resistor A is such that the difference in potential between the bridge circuit point 8 and the contact E is equal in magnitude and opposite in direction to the voltage of the thermocouple C, so that no current then flows in the detection circuit, and the galvanometer B, which is the detector element in that circuit, then occupies its neutral position.

On a change in the voltage of the thermocouple C, the galvanometer B will deflect in one direction or the other depending on the direction of the change. With the battery and thermocouple polarities indicated in Fig. 1, on an increase in the thermocouple voltage, for example, the resultant deflection of the galvanometer causes rebalancing mechanism G, which is controlled by the galvanometer B through the diagrammatically indicated connection GB, to rotate the threaded shaft E in the direction to move the contact E to the right and thus increase the potential difference between the contact E and bridge point 8. Conversely, on a decrease in the thermocouple voltage, the galvanometer deflects in the direction to cause the mechanism G to adjust the contact E to the left. The rebalancing mechanism G of Fig. 1 may be of any usual or suitable type. For example, it may be, and is hereinafter assumed to be, of the periodically operating, mechanical relay type employed in the widely used self-balanced recording potentiometer known as the "Brown potentiometer," disclosed in U. S. Patent 2,150,502, dated March 14, 1939.

The means provided in accordance with the present invention for impressing an anti-hunting voltage on the detection circuit of the network shown in Fig. 1, comprises a local circuit coupled to the detector circuit by the resistance D, and including that resistance and in series therewith, a conductor 13, a condenser H, a conductor 14, a contact I engaging and adjustable along the length of a resistor J, and the portion of the latter between the contact I and the terminal of the resistor J connected to the terminal of the resistor D which is connected to the conductor 12 and thereby to the contact E. The contact I is in threaded engagement with a threaded shaft IF which may be like the shaft F previously described, and is operatively connected to the rebalancing relay mechanism G, so that the latter, when operated, simultaneously and proportionally adjusts the contacts E and I in the same direction.

The resistor J is electrically energized so that its potential progressively increases from its left hand end to its right hand end. The resistor J and contact I thus form an adjustable voltage divider which during each rebalancing operation of the relay mechanism G, impresses a potential change on the condenser H proportional to the change in the voltage of the thermocouple C which gave rise to that rebalancing operation. The means shown for energizing the resistor J, comprises a full wave copper oxide rectifier K, having its input terminals connected to the terminals of the secondary winding 17 of an alternating current transformer L, and having its positive and negative output terminals connected by conductors 15 and 16 to the positive and negative terminals, respectively, of the resistor I.

With the rebalancing mechanism G of the character, and controlled in the manner, disclosed in the above mentioned Patent 2,150,502, the deflective position of the galvanometer B is gauged periodically, and each such gauging operation made when the galvanometer is deflected from its neutral position, initiates a corrective rebalancing operation in a direction and to an extent depending on the direction and extent of galvanometer deflection from its neutral position. After the thermocouple voltage has been constant long enough for the apparatus to attain its full balanced condition, the periodical galvanometer gauging operations do not result in any rebalancing adjustment of the contact E until a change in the thermocouple voltage occurs.

On such an occurrence, however, the galvanometer deflects and the next galvanometer gauging operation results in a corrective adjustment of the contact E. That adjustment may be the precise adjustment required to rebalance the circuit, but as a result of the galvanometer inertia, and because the periodical rebalancing adjustment is not effected until sometime after the thermocouple voltage has attained the value corresponding to the gauged galvanometer deflection, the initial corrective adjustment of the contact E may be either more or less than that required to rebalance the network. When the initial corrective adjustment is too small, it will be followed by one or more further corrective adjustments in the same direction.

In the operation of the apparatus shown in Fig. 1, the final one of any such series of further adjustments would frequently be an over adjustment, resulting in a reverse galvanometer deflection and one or more subsequent reverse rebalancing operations, if said apparatus did not include means for impressing an anti-hunting voltage on the detector circuit.

The operative effect of the special anti-hunting means shown in Fig. 1 is to maintain a constant potential on the condenser H during any period in which the voltage of the thermocouple C remains constant after the network has been properly balanced. The magnitude of the constant potential then stored on the condenser is determined by the adjustment position of the contact I and is equal to the potential drop in the portion of the resistor J between the contact I and the lower end of the resistance D, and does not cause current flow through said resistance.

Upon unbalance of the potentiometer, however, and the subsequent rebalancing adjustment of the contact E, the contact I is adjusted along the resistor J in a direction and to an extent corresponding, respectively, to the direction and extent of adjustment of the contact E, and thereby varies the voltage impressed on the local circuit including the condenser H and resistance D, and creates a current flow in said circuit.

Thus, when the thermocouple voltage increases and the rebalancing contact E is adjusted to the right, the simultaneous adjustment of contact I increases the voltage between the left end of the resistor J and the contact I, and causes a flow of charging current into the condenser H and through the resistance D in the direction to render the upper terminal of resistance D positive relative to its lower terminal. The potential drop across the resistance D thus produced, is in opposition to the then unbalanced potential of the potentiometric circuit, and effects the return of the galvanometer B to its neutral position prior to the adjustment of the potentiometer rebalancing contact E into its new potentiometer balancing position.

Upon a decrease in thermocouple voltage, the contact I will be adjusted to the left along resistance J to thereby decrease the slide wire voltage impressed on the resistance D and condenser H. The condenser H will then discharge, and the discharge current flow through resistance D will be in the direction to render the upper end of resistance D negative, with the result of returning the galvanometer to its neutral position before the network is fully rebalanced.

A condenser charging or discharging current flow through the resistance D, produced as described, quickly dies out, and as it subsides the galvanometer again deflects in the same direction as it did in response to the initial unbalance of the network, when the latter has not been fully rebalanced. The new deflection of that galvanometer initiates a new rebalancing operation, and if that rebalancing operation does not completely rebalance the network it will be repeated. As will be apparent, however, when an initial change in thermocouple voltage results in two or more successive rebalancing operations those operations will normally diminish progressively in magnitude, so that if over shooting is prevented, full rebalancing of the network is quickly effected.

In Fig. 2 I have diagrammatically illustrated the use of the present invention in a self-balancing potentiometric measuring and control system which is quite different in character from that shown in Fig. 1, although it may comprise, and as shown, does comprise, an electric network which is like that shown in Fig. 1, except in respect to the character of the detector means included in the detector circuit, and in respect to the form of the voltage divider resistor J and associated parts shown in Fig. 2. In the Fig. 2 apparatus, however, the rebalancing operations are not effected periodically, but are initiated as soon as needed, and each such rebalancing operation continues until the detector means is restored to its normal balanced condition.

The potentiometric mechanism shown in Fig. 2 is of the so called "conversion" type disclosed and claimed in the application for patent of Walter P. Wills, filed December 1, 1941, Serial No. 421,173. As shown in Fig. 2 the potentiometric mechanism comprises means for causing the thermocouple voltage, when unbalanced, to produce a pulsating current flow in the detector circuit, and comprising means including electronic valves for amplifying the pulsating current and for using the amplified current to control the operation of a reversibly rotative electric motor M mechanically connected to and rotating the threaded shaft F, which adjusts the potentiometer contact E, and the threaded shaft if, which adjusts the voltage divider contact IA. The latter does not differ significantly from the contact I of Fig. 1, but the shaft if differs from the shaft IF of Fig. 1 in being reversely threaded, so that the simultaneous rotation of the shafts if and F moves the contacts E and IA toward or away from one another, depending on the direction of rotation. In Fig. 2, MF diagrammatically represents the operating action between the shaft of the motor M and the contact adjusting shafts if and F.

The direction of movement given the contact IA on a given rebalancing adjustment of the potentiometer contact E requires a reversal in polarity of the voltage divider resistor J which is effected by connecting the positive terminal 15 of the rectifier K to the left end, and by connecting the negative rectifier terminal 16 to the right end of the resistor J. In Fig. 2, also, the negative right end of the resistor J is directly connected by the conductor 14 to the condenser H, and the contact IA connects the portion of the resistor J engaged by it to an extension of the conductor 12 by which the lower end of the resistance D is connected to the potentiometer contact E. As will be apparent, the differences between Figs. 1 and 2 in respect to their provisions for impressing anti-hunting voltages on their respective detection circuits are in the nature of mechanical inversions and involve no real difference in general operative principle.

While the operation of the reversible relay motor M employed in Fig. 2 involves no such delays as are inherent in the previously described type of relay mechanism shown in Fig. 1, the inertia of the motor M of Fig. 2 results in a motor coasting tendency which would frequently result in over shooting and hunting, if the apparatus shown in Fig. 2 did not include the resistance D and the voltage divider and associated means for impressing an anti-hunting voltage on the detector circuit in the course of rebalancing operations.

The apparatus shown diagrammatically in Fig. 2 includes a potentiometric measuring circuit arrangement identical with that shown in Fig. 1, except that the current responsive apparatus connected between the bridge circuit point 8 and the calibrating switch 9 of Fig. 2 when that switch engages the conductor 10, is not a galvanometer, but comprises the primary winding of a transformer O and a pulsator or vibrator P which converts the current generated by the voltage of thermocouple C into a pulsating current, so that the secondary voltage generated in the transformer O is an alternating voltage adapted for electronic amplification.

As diagrammatically shown, the primary winding of the transformer O comprises two sections 21 and 22 which have their adjacent ends connected together and to the measuring circuit point 8. The core structure and casing of the transformer O and a shield 23 interposed between the transformer primary windings and its secondary winding 24 are connected to a grounding conductor 25. The remote ends or terminals of the primary winding sections 21 and 22 are connected to the stationary contacts 26 and 27, respectively, of the vibrator P. The latter comprises a vibrating reed 28 carrying a contact moved by the vibration of the reed back and forth between the contacts 26 and 27 which it alternately engages.

The reed 28 is connected to the calibration switch member 9 of Fig. 2, and is caused to vibrate by a winding 29 having its terminals connected to a source of alternating current. A permanent magnet 30 is associated with the reed 28 for polarizing and synchronizing purposes, and in operation the reed 28 is in continuous vibration with a frequency corresponding to that of the source of energization for the winding 29. In consequence, the currents flowing alternately through the winding sections 21 and 22 creates an alternating voltage in the secondary winding 24 of the transformer O, which is well adapted for amplification in the electronic amplifying and control apparatus which has its input terminals connected to the terminals of the transformer secondary winding 24.

Said electronic apparatus comprises a drive section and an amplifying section, both of which receive energizing current from a transformer LA having its primary winding connected to the supply conductors L' and L². The transformer LA differs from the transformer L in having three secondary winding sections 31, 32 and 33, in addition to the section 17 which energizes the rectifier K. The drive section of the electronic apparatus comprises the reversibly rotating motor M and an electronic tube Q. The amplifying section comprises amplifying tubes R and S.

The motor M, as diagrammatically shown, comprises a rotor 34 having its shaft mechanically connected by MF to the threaded shafts F and if to simultaneously adjust the contacts E and IA. The motor M has a pair of terminals 35 and 36 connected through a condenser 37 of suitable value to the alternating supply conductors L' and L², and has a second pair of terminals 38 and 39 connected respectively to mid-point of secondary winding 31 and to one end terminal of the secondary winding 32 of the transformer LA. For its intended use, the motor M may be of the form schematically shown in the drawing in which one pair of oppositely disposed field poles are surrounded by a winding 40 connected between the motor terminals 35 and 36, and the other pair of poles are surrounded by a winding 41 connected between the motor terminals 38 and 39.

Due to the action of the condenser 37, the current flowing through the motor winding 40 will lead the voltage of the alternating supply conductors L' and L² by approximately 90°. The current supplied to the winding 41 will be approximately in phase with or will be displaced 180° from the voltage of the alternating current supply conductors L' and L². The windings 40 and 41 thus establish fields in the rotor 34 which are displaced from one another approximately 90° in one direction or the other, depending upon whether the winding 41 is energized with current in phase with the voltage of the alternating supply conductors L' and L², or displaced 180° in phase therefrom. As will become apparent from the subsequent description, the phase of the current flow through the winding 41 and the rotation of the rotor 34 depends upon, and is controlled by the direction of unbalance of the potentiometric measuring circuit, and the duration of said rotation depends on the duration of said unbalance, so that the rotation of the rotor tends to adjust the contact E to the extent as well as in the direction to rebalance said circuit.

The alternating voltage generated in the secondary winding 24 of the transformer O is amplified through the action of the amplifying tubes R and S, and the amplification thus effected is utilized in energizing the phase winding 41 of the motor M to control the selective actuation of the latter for rotation of the rotor 34 in one direction or the other.

As shown, the electronic amplifying tube R includes two heating type triodes enclosed in the same envelope and designated by the reference symbols 43 and 44. The triode 43 includes anode, control electrode, cathode, and heater filament elements, and the triode 44 includes like elements. The filaments of the triodes 43 and 44 are connected in parallel and receive energizing current from the low voltage secondary winding 33 of the transformer O. The conductors through which the secondary winding 33 supplies current to the heater filaments of the electronic tubes R and also to the heater filaments of the tubes S and Q, have been omitted to simplify the drawing.

The electronic amplifying tube S includes two heater type triodes, designated by the reference characters 45 and 46, and enclosed in the same envelope. Both of the triodes of tube S include anode, control electrode, cathode and heater filament elements. The electronic tube Q also includes two heater type triodes, designated by the reference characters 47 and 48 and enclosed in the same envelope and each including anode, control electrode, cathode, and heater filament elements.

The triode 46 of the electronic valve S is utilized as a half wave rectifier providing direct current voltage for energizing the anode or output circuits of the triodes 43, 44 and 45. As shown, the control electrode and cathode of the triode 46 are directly connected to each other and the output circuit thereof is energized by the transformer secondary winding 32 through a circuit which may be traced from the left end terminal of the winding 32, as seen in the drawing, through the conductor 49 to the anode of the triode 46, the cathode thereof, and through a conductor 50 to the positive terminal of a filter generally designated by the reference numeral 51. The negative terminal of filter 51 is connected by a conductor 52 to the right end terminal of the transformer secondary winding 32.

The filter 51 includes a condenser 53 which operates to smooth out the ripple in the output voltage of the filter between the points 54 and 55. The filter 51 also includes a resistance 56 and a condenser 57 which operate to smooth out the output voltage of the filter between the points 54 and 58. The filter 51 includes a further resistance 59 and a condenser 60 for smoothing out the output voltage between the filter points 54 and 61. The filter, therefore, comprises three stages. Such a three-stage filter is provided because for satisfactory and efficient operation it is desirable that the anode voltage supplied to the triode 43 be substantially free from ripple whereas it is not necessary to supply anode voltage so completely free from ripple to the output circuit of the triode 44. Likewise it is not necessary to supply anode voltage as free from ripple to the triode 45 as to the triode 44.

The anode circuit of the triode 43 may be traced from the filter point 61, which comprises the positive terminal of the filter, through a fixed resistance 62 to the anode of the triode 43, to the cathode thereof, and through a cathode biasing resistance 63, which is shunted by a condenser 64, to the negative filter point 54 through the previously mentioned grounded conductor 25, a conductor 65 and a conductor 52. The cathode biasing resistance 63 and the parallel connected condenser 64 are utilized for biasing the control electrode of the triode 43 negatively with respect to the cathode.

The input circuit of the triode 43 may be traced from the cathode to the parallel connected resistance 63 and condenser 64 through the transformer secondary winding 24, and a conductor 66 to the control electrode of the triode 43.

The output circuit of the triode 43 is resistance capaciy coupled to the input circuit of the triode 44 by means of a condenser 67 and a resistance 68. More particularly, the anode of the triode 43 is connected by condenser 67 to the control electrode of the triode 44 and the control electrode of the triode 44 is connected through the resistance 68 to the conductor 25 and thereby to the cathode of the triode 44. The anode circuit of the triode 44 may be traced from the positive terminal 58 of the filter 51 through a fixed resistance 69 to the anode of the triode 44, the cathode thereof, and conductors 25, 65 and 52 to the negative terminal 54 of the filter.

The output circuit of the triode 44 is resistance capacity coupled to the input circuit of the triode 45 by means of a condenser 70 which is connected between the anode of the triode 44 and the control electrode of the triode 45, and by means of a resistance 71 which is connected between the control electrode of the triode 45 and the cathode thereof. It is noted the resistances 68 and 71 which are connected in the input circuits of the triodes 44 and 45, respectively, operate to maintain the control electrodes of the triodes 44 and 45 at the same potentials as their associated cathodes when no voltage is induced in the transformer secondary winding 24, and upon the induction of an alternating voltage in the secondary winding 24, resistances 68 and 71 permit the flow of grid current between the control electrodes of the triodes 44 and 45 and their associated cathodes and thereby limit the extent the control electrodes of the triodes are permitted to go positive with respect to their associated cathodes. With the control electrode of triode 45 connected to the resistance 71 by an adjustable contact 71', as shown, said resistance and contactor form a means for varying the amount of signal impressed on the control electrode of the triode 45 from the plate circuit of the triode 44.

The anode circuit of the triode 45 may be traced from the positive terminal 55 of the filter 51 through a fixed resistance 72 to the anode of the triode, the cathode thereof, and conductors 52 and 65 to the negative terminal 54 of the filter. The output circuit of the triode 45 is resistance capacity coupled to the input circuits of the triodes 47 and 48 by means including a condenser 73 and a resistance 74. The condenser 73 is connected by a conductor 75 to the control electrodes of the triodes 47 and 48, and is connected to the cathodes of those triodes through the resistance 74. As will be apparent, the signal voltage from the output circuit of the triode 45 is impressed simultaneously and equally on both of the control electrodes of the triodes 47 and 48.

Anode voltage is supplied the output circuits of the triodes 47 and 48 from the high voltage secondary winding 31 of the transformer LA. The anode of the triode 47 is connected to the left end terminal of the transformer secondary winding 31 and the anode of the triode 48 is connected to the right end terminal of that said winding 31. The cathodes of the triodes 47 and 48 are connected together and through a fixed resistance 77 and the conductor 65 to the terminal 39 of the motor M. The terminal 38 of the motor M is connected to a center tap 78 of the transformer secondary winding 31. Thus, the triodes 47 and 48 are utilized to supply energizing current to the phase winding 41 of motor M.

The motor M is preferably so constructed that the impedance of the winding 41 is of the proper value to match the impedance of the anode circuits of the triodes 47 and 48 when the motor is operating in order to obtain the most efficient operation. Preferably, the motor is so constructed that it has a high ratio of inductance to resistance, for example, of the order of from 6-1 to 8-1 at the frequency of the energizing current supplied to it. This provides for maximum power during the running condition of the motor with the least amount of heating, and also provides a low impedance path for braking purposes.

As noted hereinbefore, energizing current is supplied to the motor winding 40 from the alternating current supply conductors L' and L² through the condenser 37. The condenser 37 is so selected with respect to the inductance of the motor winding 40 as to provide a series resonant circuit having a unity power factor. By virtue of the series resonant circuit, the total impedance of the motor winding 40 is substantially equal to the resistance of the winding, and since this resistance is relatively low, a large current flow through the winding 40 is made possible. This permits the attainment of maximum power and torque from the motor M. In addition, the current flow through the motor winding 40 is in phase with the voltage of the alternating current supply conductors L' and L² because of the series resonant circuit. The voltage across the motor winding 40, however, leads the current by substantially 90° because of the inductance of the winding 40.

As will now be apparent, energizing current is supplied the motor winding 41 from the transformer secondary winding 31 through the anode circuits of the triodes 47 and 48. A condenser 79 is connected in parallel with the motor winding 41 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 47 and 48, and accordingly provides efficient operation. The relatively low internal circuit impedance approximates the actual resistance of the winding 41, and since this resistance is relatively low, the impedance of the local circuit is also relatively low.

For the first half cycle of the alternating voltage produced across the terminals of the transformer secondary winding 31, the anode of the triode 47 is rendered positive with respect to said center tap 78, and during the second half cycle, the anode of triode 48 is made positive with respect to center tap 78. Accordingly, the triodes 47 and 48 are arranged to conduct on alternate half cycles of the alternating current supplied by the supply conductors L' and L².

When no signal or grid bias is impressed upon the control electrodes of the triodes 47 and 48 pulsating unidirectional current of twice the frequency of the alternating voltage supplied by conductors L' and L² is impressed on the motor winding 41. When thus energized the motor M is not urged to rotation in either direction but remains stationary. Due to the relatively high direct current component of the current then flowing through the motor winding 41 the core structure of the motor M tends to become saturated whereby the inductive reactance of the motor winding 41 is relatively small. The condenser 79, in shunt to the motor winding 41 is so chosen that the condenser and motor winding then provides a parallel resonant circuit. This saturation of the core structure of the motor M operates to exert an appreciable damping effect on the rotor 34, or in other words, an effect tending to prevent rotation of the rotor 34. Consequently, if the rotor 34 has been rotating, saturation of the motor core structure operates to quickly stop the rotation.

When an alternating grid bias is impressed on control electrodes of triodes 47 and 48, the magnitude of the pulses of current flowing in the anode circuit of one triode 47 or 48 will be increased while the magnitude of the pulses of current flowing in the anode circuit of the other triode will be decreased. Accordingly, the pulses of unidirectional current supplied to the motor winding 41 during the first half cycle will predominate over those supplied the motor winding during the second half cycle. Which anode current will be increased depends upon whether the bias voltage is in phase or 180° out of phase with the voltage of supply conductors L¹ and L².

Such energization of the motor winding 41 operates to introduce therein an alternating component of current of the same frequency as that supplied by the alternating current supply conductors L¹ and L². This alternating component of current will either lead or lag by 90° the alternating current flowing through the motor winding 40 depending upon which of the triodes 47 and 48 has its anode current increased by the prevailing grid bias, and with either phase relation the two currents produce a magnetic field in the motor core structure which rotates in one direction or the other, depending upon said current phase relation and effects rotation of the motor rotor 34 in the corresponding direction. Moreover, when the motor winding 41 is so energized the direct current component of the current flowing therein is decreased, and consequently, the saturation of the motor core structure is decreased with the result that the rotor damping effect is reduced.

In normal operation, the grid bias potential impressed on the control electrodes of the triodes 47 and 48 through their connection by conductor 75 and condenser 73 to the anode circuit of the triode 45, is dependent in magnitude and direction upon the magnitude and direction of the pulsating current flow through the detector circuit including the thermocouple C, vibrator P, and primary winding sections 21 and 22 of the transformer O.

When the temperature of the thermocouple C is steady and the position of the contact E is correct for that temperature, no grid bias potential is transmitted to the controlling electrodes of the triodes 47 and 48 by the anode circuit of the triode 45, and the rotor 34 of the motor M has no tendency to rotate. When this biasing condition is disturbed, due to an increase in the temperature of the thermocouple C, the motor M will rotate in the direction to move the contact E and pen carriage e up scale. Conversely, when the zero bias condition is disturbed by a decrease in the thermocouple temperature, the motor M will give the pen carriage e and contact E a down scale adjustment.

In the operation of apparatus of the character shown in Fig. 2, the rebalancing rotation of the motor M is substantially contemporaneous with the detector circuit current flow which is indicative of the need for the rebalancing action. The fact that each rebalancing operation of the apparatus shown in Fig. 2 is continuous instead of comprising intermittent steps as each rebalancing operation may when the rebalancing mechanism is of the character disclosed in Patent 2,150,502, gives rise to an over shooting tendency as a result of coasting movement of the rebalancing motor when the operative energization of its windings is terminated.

While the type of apparatus shown in Fig. 2 has an inherent capacity for rebalancing more rapidly than apparatus in which the rebalancing operation is effected by the use of the periodically acting relay mechanism above described, and while the factors tending to produce over shooting differ somewhat in the two kinds of apparatus collectively shown in Figs. 1 and 2, the same general advantage can be obtained by the use of the invention in the apparatus shown in Fig. 1 as in the kind shown in Fig. 2. With each form of apparatus, the use of the present invention reduces the over shooting tendency and resultant hunting tendency, and with each form of apparatus, the reduction in the risk of over shooting and resultant hunting makes it possible to speed up the rebalancing operation and thus contributes to measuring accuracy.

With either form of apparatus disclosed, the mechanism used to rebalance the measuring network and to adjust the voltage divider may be used to adjust a control valve or the like, as well as to adjust a recorder pen carriage. Thus, for example, the rotor 34 of the rebalancing motor M may be connected, as shown in Fig. 2, to the spindle of a valve U which is thereby given throttling adjustments proportional in direction and magnitude to the rebalancing adjustments given the contact E. The valve U may thus be adjusted, for example, to increase and decrease the fuel supply to a furnace, as the temperature of the furnace decreases and increases and thereby decreases and increases the temperature and voltage of the thermocouple C.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In self-balancing measuring apparatus, the combination with a normally balanced electrical network comprising a detector circuit including a source of voltage to be measured, a resistance and detector means, rebalancing mechanism controlled by said detector means for rebalancing said network on and in accordance with a change in said voltage, a local circuit including said resistance, a condenser and an adjustable voltage source connected in series with one another, and means actuated by said mechanism for adjusting the last mentioned source on each rebalancing operation to thereby vary the magnitude of the voltage impressed on said local circuit in accordance with the extent of the rebalancing operation and thereby create a temporary current flow through said resistance in the direction to reduce the current flow in said detector circuit created by said change in the first mentioned voltage.

2. In self-balancing measuring apparatus, the combination with a normally balanced electrical network comprising a detector circuit including a source of voltage to be measured, a resistance and detector means responsive to current flow in said circuit, network rebalancing mechanism controlled by said detector means and comprising a reversibly rotatable electric motor energized by said detector means for continuous rotation while current is flowing in said circuit in a direction dependent on the direction of flow of said current, a local circuit including a condenser, said resistance and an adjustable source of voltage connected in series with one another, and means through which said source is adjusted by said mechanism in each rebalancing operation thereby varying the voltage impressed on said local circuit at a rate proportioned to the speed of said motor and thereby to create a temporary current flow through said resistance in the direction to reduce a current flow in said detector circuit created by a change in the first mentioned voltage.

3. In self-balancing potentiometric apparatus, the combination with a normally balanced electrical network comprising a bridge circuit and a detector circuit, a source of unidirectional voltage to be measured, a resistance and current detector means, all included in said detector circuit, rebalancing mechanism controlled by said detector means for rebalancing said network on and in accordance with network unbalance created by a change in said voltage, a local circuit including said resistance, a condenser and an adjustable unidirectional voltage divider, a rectifier supplying unidirectional energizing voltage to said voltage divider, and means actuated by said rebalancing mechanism for adjusting said divider on each rebalancing operation in proportion to the extent of said operation to thereby create a temporary current flow through said resistance in the direction to reduce the current flow in said detector circuit created by said change in the first mentioned voltage.

4. In self-balancing measuring apparatus, the combination with a normally balanced electrical network comprising a detector means including a source of voltage to be measured, a resistance and detector means responsive to current flow in said circuit, a network rebalancing, reversibly rotatable, electric motor, a local circuit including a condenser, said resistance and an adjustable source of voltage connected in series with one another adjusted by said motor in each rebalancing operation to vary the magnitude of the voltage impressed on said local circuit in accordance with the extent of the rebalancing operation and thereby create a temporary current flow through said resistance in the direction to reduce the current flow in said detector circuit created by a change in the first mentioned voltage, said detector means comprising means for converting a continuous current into a pulsating unidirectional current and a transformer, and means including electronic amplifying means controlled by said transformer for energizing said motor for operation in accordance with the direction and duration of the flow of said pulsating current.

5. In self-balancing measuring apparatus, the combination with a normally balanced electric network comprising a slide wire resistor, a contact adjustable along said resistor and a detector circuit including said contact, a source of voltage to be measured, a resistance and detector means, rebalancing mechanism controlled by said detector means for rebalancing said network by adjusting said contact along said resistor on and in accordance with a change in said voltage, a second slide wire resistor, means for maintaining a constant potential difference between the terminals of said second resistor, a second sliding contact engaging said second resistor, a local circuit including said resistance, a condenser, said second contact and a portion of said second resistor varying with the adjustment along the latter of said second contact, and means for adjusting said second contact along said second resistor on and in proportion to the adjustment of the first mentioned contact effected in each rebalancing operation.

HARRY S. JONES.